Feb. 26, 1952  C. S. KELLEY  2,587,047
ROTOR FOR DISK BRAKES
Filed April 27, 1950

INVENTOR.
Cecil S. Kelley
BY
Frank E. Miller
ATTORNEY

Patented Feb. 26, 1952

2,587,047

UNITED STATES PATENT OFFICE 2,587,047

ROTOR FOR DISK BRAKES

Cecil S. Kelley, Forest Hills, Pa., assignor to Westinghouse Air Brake Company, a corporation of Pennsylvania Application April 27, 1950, Serial No. 158,548

1 Claim. (Cl. 188—218)

This invention relates to friction elements and more particularly to those employed as rotors in disc brakes.

In disc brakes for railway vehicles for example, such brakes may be desirably simple and inexpensive if the annular rotor, or each rotor in case of more than one, employed for frictional engagement with the respective brake stator, is in the form of a single piece casting in lieu of an expensive, fabricated annular assemblage.

In order to employ such a rotor or rotors of single piece or continuous cast form, their thickness must be sufficiently great as will provide strength to withstand the heavy railway vehicle braking load imposed on them. Due to their thickness and the heavy braking loads imposed on them during brake applications, thermal stresses tend to be generated from front to back and from inner edge to outer edge great enough to cause warping and cracking of the rotors, with consequent loss of their utility.

In view of the above, it is a principal object of the present invention to provide a novel, relatively simple, strong, and inexpensive disc brake rotor of the continuous cast type for railway vehicle braking use which will not crack or warp with continued use.

Oother objects and advantages of the invention will be apparent from the following more detailed description of the invention.

Figure 1:
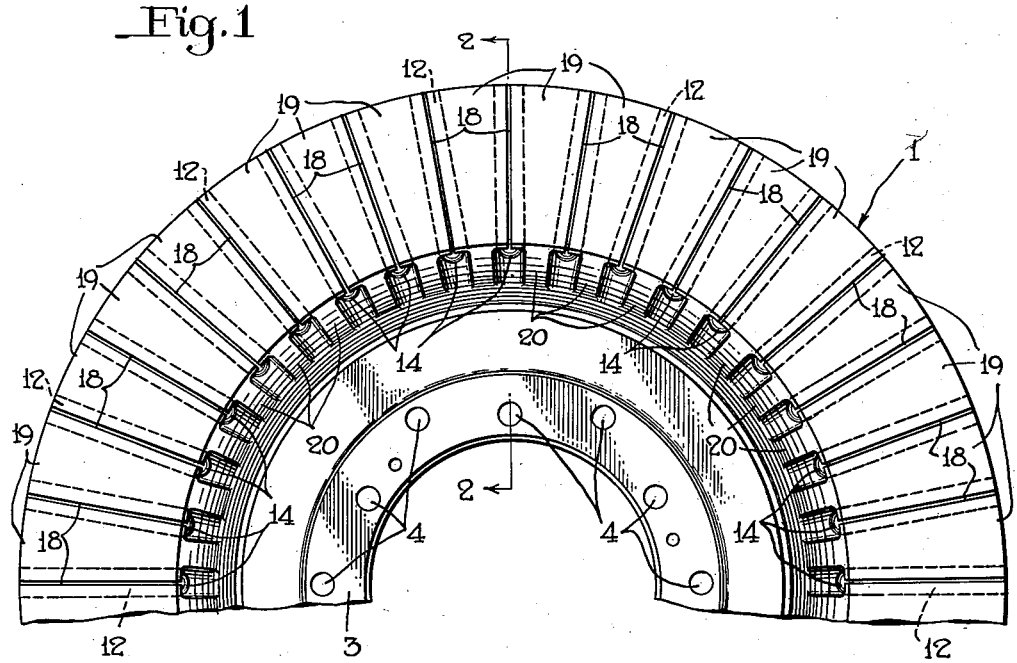
Figure 2:
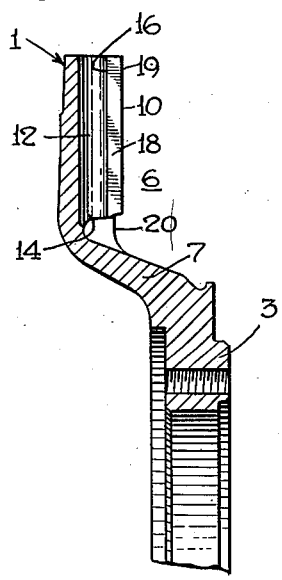
Figure 3:
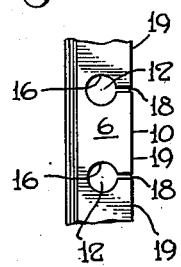

In the accompanying drawing; Fig. 1 is a face view of a segment of an annular disc brake rotor of the continuous cast type embodying the invention; Fig. 2 is a cross-sectional view taken along the line 2—2 in Fig. 1; and Fig. 3 is a view of the outer peripheral edge of a segment of the rotor shown in Fig. 1.

Description

Referring to the drawing, the continuous annular cast rotor 1 embodying the invention, and disclosed but not claimed in my application, Serial No. 158,549, filed April 27, 1950, comprises an inwardly extending annular flange 3 which is provided with a plurality of bolt holes 4 to allow for securing the rotor to a railway vehicle wheel for rotation therewith with said flange extending at right angles to the axis of rotation. The flange 3 has a connection with an offset parallel and coaxially arranged annular braking portion 6 of the rotor by means of an outwardly and axially extending continuous spoke 7 which is cast integral with said flange and braking portion and curved to give rigidity and strength to such connection.

The annular braking portion 6 of the rotor is provided with an annular face 10 which is machined at right angles to the axis of the rotor to provide a smooth braking surface for frictional engagement with the usual brake stator (not shown).

To allow for dissipation of heat generated by such frictional engagement, a plurality of circumferentially spaced apart cooling passages 12 are drilled through the annular braking portion 6. These cooling passages 12 extend radially outward from respective openings 14 at the inner peripheral edge of the annular braking portion 6 of the rotor to respective openings 16 at the outer peripheral edge to allow for passage of air therethrough during rotation of the rotor to dissipate heat from the portion 6 in which the passages are formed. To relieve the thermal stresses generated in the portion 6 at the braking surface as well as to provide further dissipation of heat at such surface, radial slots 18 are provided. Each of the slots 18 opens from a respective passage 12 to the face 10, the several slots thereby dividing the part of the braking portion 6 from the face 10 to passages 12 into a plurality of circumferentially spaced apart segments 19 integrally connected by the part of portion 6 at the side of said passages opposite said slots. Such slots 18 allow for thermal expansion of the metal at the braking surface of the rotor where temperature will be greatest and thereby preclude warping of such surface. The slots 18 along with the passages 12 also allow for passage of cooling air through the rotor to minimize temperature rise at the braking surface 10 and thereby minimize such expansion. Intermediate each two adjacent openings 14 at the inner peripheral edge of braking portion 6 there is formed a web 20 which webs connect the integral segments 19 of the body portion 6, which are separated by adjacent slots 18, to the spoke 7 at the inner periphery of such portions to impart strength and rigidity thereto. Such webs 20 also will act as fan blades during rotation of the rotor, encouraging air at the inner periphery of the body portion 6 to flow into and radially outward through the cooling passages 12.

Summary

It will be seen from the foregoing that I have provided a novel, relatively simple, strong, and inexpensive disc brake rotor for railway vehicle braking use which will not crack or warp with heavy use.

Having now described the invention, what I claim as new and desire to secure by Letters Patent is:

A friction element comprising an inner annular portion adapted to be secured to mounting means, a continuous integral spoke attached at its inner peripheral edge to the outer periphery of said inner annular portion and extending radially and axially outward therefrom, an outer integral annular portion attached at its inner periphery to the outer periphery of said spoke, said outer annular portion being disposed parallel to said inner annular portion coaxial therewith and having an annular friction face, a plurality of circumferentially spaced apart air conveying passages which open radially from inner to outer peripheral edges thereof, a plurality of radial slots opening said passages to said friction face, and a plurality of circumferentially spaced apart radial ribs intermediate the inner openings to said passages and rigidly connecting the sections of said outer annular portion which are separated by said slots to said spoke.

CECIL S. KELLEY.

REFERENCES CITED

The following references are of record in the file of this patent:

UNITED STATES PATENTS

| Number | Name | Date |
| --- | --- | --- |
| 2,238,943 | McCune | Apr. 22, 1941 |
| 2,368,985 | Heater | Feb. 6, 1945 |